(12) United States Patent
Shibayama et al.

(10) Patent No.: US 8,068,224 B2
(45) Date of Patent: *Nov. 29, 2011

(54) SPECTROSCOPIC MODULE

(75) Inventors: Katsumi Shibayama, Hamamatsu (JP);
Takafumi Yokino, Hamamatsu (JP);
Tomofumi Suzuki, Hamamatsu (JP);
Helmut Teichmann, Zurich (CH);
Dietmar Hiller, Zurich (CH); Ulrich Starker, Zurich (CH)

(73) Assignee: Hamamatsu Photonics K.K., Hamamatsu-shi, Shizuoka (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/377,325

(22) PCT Filed: Jun. 5, 2008

(86) PCT No.: PCT/JP2008/060361
§ 371 (c)(1),
(2), (4) Date: Feb. 12, 2009

(87) PCT Pub. No.: WO2008/149928
PCT Pub. Date: Dec. 11, 2008

(65) Prior Publication Data
US 2010/0201980 A1 Aug. 12, 2010

(30) Foreign Application Priority Data
Jun. 8, 2007 (JP) ............... P2007-153014

(51) Int. Cl.
*G01J 3/28* (2006.01)
(52) U.S. Cl. ..................................... 356/328
(58) Field of Classification Search .......... 356/326, 356/328
See application file for complete search history.

(56) References Cited

U.S. PATENT DOCUMENTS

| 4,784,935 A | 11/1988 | Ehrfeld et al. |
| 5,026,160 A * | 6/1991 | Dorain et al. ............ 356/328 |
| 6,081,331 A * | 6/2000 | Teichmann ............... 356/328 |
| 6,181,418 B1 | 1/2001 | Palumbo et al. |

(Continued)

FOREIGN PATENT DOCUMENTS
CN 1800941 7/2006
(Continued)

OTHER PUBLICATIONS

F. Reininger, et al., "VIRTIS: Visible Infrared Thermal Imaging Spectrometer for the Rosetta Mission," Proceedings. SPIE, vol. 2819 [Imaging Spectrometry II], Aug. 1996, pp. 66-77.

*Primary Examiner* — F. L. Evans
(74) *Attorney, Agent, or Firm* — Drinker Biddle & Reath LLP

(57) ABSTRACT

In the spectroscopy module 1, a light absorbing layer 6 having a light-passing hole 6a through which light L1 advancing into a spectroscopic portion 3 passes and a light-passing hole 6b through which light L2 advancing into a light detecting portion 4a of a light detecting element 4 passes is integrally formed by patterning. Therefore, it is possible to prevent deviation of the relative positional relationship between the light-passing hole 6a and the light-passing hole 6b. Further, since the occurrence of stray light is suppressed by the light absorbing layer 6 and the stray light is absorbed, the light detecting portion 4a of the light detecting element 4 can be suppressed from being made incident. Therefore, according to the spectroscopy module 1, it is possible to improve the reliability.

13 Claims, 6 Drawing Sheets

U.S. PATENT DOCUMENTS

| | | |
|---|---|---|
| 6,303,934 B1 | 10/2001 | Daly et al. |
| 6,862,092 B1 * | 3/2005 | Ibsen et al. .................... 356/328 |
| 7,092,090 B2 | 8/2006 | Shimizu et al. |
| 7,369,228 B2 | 5/2008 | Kerstan et al. |
| 7,605,917 B2 | 10/2009 | Teichmann et al. |
| 7,697,137 B2 | 4/2010 | Comstock, II |
| 2003/0197862 A1 | 10/2003 | Cohen et al. |
| 2004/0196458 A1 | 10/2004 | Shimizu et al. |
| 2004/0239931 A1 | 12/2004 | Teichmann et al. |
| 2007/0252989 A1 | 11/2007 | Comstock |
| 2010/0103412 A1 | 4/2010 | Shibayama et al. |
| 2010/0201980 A1 | 8/2010 | Shibayama et al. |
| 2010/0208257 A1 | 8/2010 | Shibayama et al. |
| 2010/0208258 A1 | 8/2010 | Shibayama et al. |
| 2010/0208259 A1 | 8/2010 | Suzuki et al. |
| 2010/0214563 A1 | 8/2010 | Suzuki et al. |
| 2010/0238439 A1 | 9/2010 | Suzuki et al. |

FOREIGN PATENT DOCUMENTS

| | | |
|---|---|---|
| DE | 197 17 015 | 10/1998 |
| JP | 54-143685 | 11/1979 |
| JP | 62-6126 | 1/1987 |
| JP | 63-229765 | 9/1988 |
| JP | 4-294223 | 10/1992 |
| JP | 5-322653 | 12/1993 |
| JP | 6-129908 | 5/1994 |
| JP | 6-229829 | 8/1994 |
| JP | 8-145794 | 6/1996 |
| JP | 2000-298066 | 10/2000 |
| JP | 3119917 | 10/2000 |
| JP | 2003-139611 | 5/2003 |
| JP | 2003-202463 | 7/2003 |
| JP | 2003-243444 | 8/2003 |
| JP | 2003-318478 | 11/2003 |
| JP | 2003-337206 | 11/2003 |
| JP | 2004-191246 | 7/2004 |
| JP | 2004-354176 | 12/2004 |
| JP | 2004-537750 | 12/2004 |
| JP | 2005-308495 | 11/2005 |
| JP | 2006-30031 | 2/2006 |
| WO | WO 99/53350 | 10/1999 |

* cited by examiner

SPECTROSCOPIC MODULE

TECHNICAL FIELD

The present invention relates to a spectroscopy module for dispersing light to detect the light.

BACKGROUND ART

As a conventional spectroscopy module, Patent Document 1 has disclosed, for example, that which is provided with a light-transmitting supporting body, an incident slit portion which makes light incident into the supporting body, a concave diffraction grating for dispersing the light made incident into the supporting body to reflect the light and a diode for detecting the light dispersed and reflected by the concave diffraction grating.
Patent Document 1: Japanese Published Examined Patent Application No. 3119917

DISCLOSURE OF THE INVENTION

Problems to be Solved by the Invention

Nevertheless, in the above-described spectroscopy module, upon attachment of the incident slit portion and the diode to the supporting body, there is a fear that a relative positional relationship between the incident slit portion and the diode may deviate, thus resulting in a decrease in reliability of the spectroscopy module.

Now, the present invention has been made in view of the above situation, an object of which is to provide a highly reliable spectroscopy module.

Means for Solving the Problems

In order to attain the above object, the spectroscopy module of the present invention is provided with a light transmitting body portion, a spectroscopic portion for dispersing light made incident from a predetermined plane of the body portion into the body portion to reflect the light on the predetermined plane, and a light detecting element supported on the predetermined plane to detect the light dispersed and reflected by the spectroscopic portion, and in which a light absorbing layer having a first light-passing hole through which light advancing to the spectroscopic portion passes and a second light-passing hole through which light advancing to the light detecting element passes is formed on the predetermined plane.

In the spectroscopy module, the light absorbing layer has the first light-passing hole through which light advancing to the spectroscopic portion passes and the second light-passing hole through which light advancing to the light detecting element passes. Therefore, it is possible to prevent the deviation of a relative positional relationship between the first light-passing hole and the second light-passing hole. Further, since the occurrence of stray light is suppressed by the light absorbing layer and the stray light is absorbed, the stray light can be suppressed from being made incident into the light detecting element. Therefore, according to the spectroscopy module, it is possible to improve the reliability.

In the spectroscopy module of the present invention, it is preferable that the body portion is provided with a plurality of light-transmitting members laminated in a direction approximately orthogonal to the predetermined plane. Further, it is more preferable that the light-transmitting member having the predetermined plane is formed in a plate shape. Since the spectroscopy module is constituted as described above, it is possible to easily form the light absorbing layer and implement the light detecting element on the body portion.

In the spectroscopy module of the present invention, it is preferable that the light absorbing layer is formed between adjacent light-transmitting members in a direction approximately orthogonal to the predetermined plane. Since the spectroscopy module is constituted as described above, it is possible to limit light which advances to the body portion, while spreading, in such a manner that the light can arrive at a desired region and also more effectively suppress stray light from being made incident into the light detecting element.

In the spectroscopy module of the present invention, it is preferable that wiring which is electrically connected to the light detecting element is formed on the predetermined plane. For example, where the body portion is made with glass and the wiring is made with a metal, it is possible to prevent the wiring from being broken due to the fact that the wiring is more firmly attached to the body portion. In this instance, the wiring is preferably provided with a light absorbing layer on the predetermined plane. Since the spectroscopy module is constituted as described above, it is possible to prevent stray light from being reflected in a diffused manner by the wiring.

In the spectroscopy module of the present invention, it is preferable that a wiring electrically connected to a light detecting element is formed on a plane opposite to the predetermined plane on a light absorbing layer formed on the predetermined plane. Since the spectroscopy module is constituted as described above, while stray light is prevented from being reflected in a diffused manner by the wiring, it is possible to suppress the occurrence of the stray light by the light absorbing layer and also secure the absorption of the stray light by the light absorbing layer to a greater extent.

Effects of the Invention

According to the present invention, it is possible to improve the reliability.

DESCRIPTION OF REFERENCE NUMERALS

Figure 1:
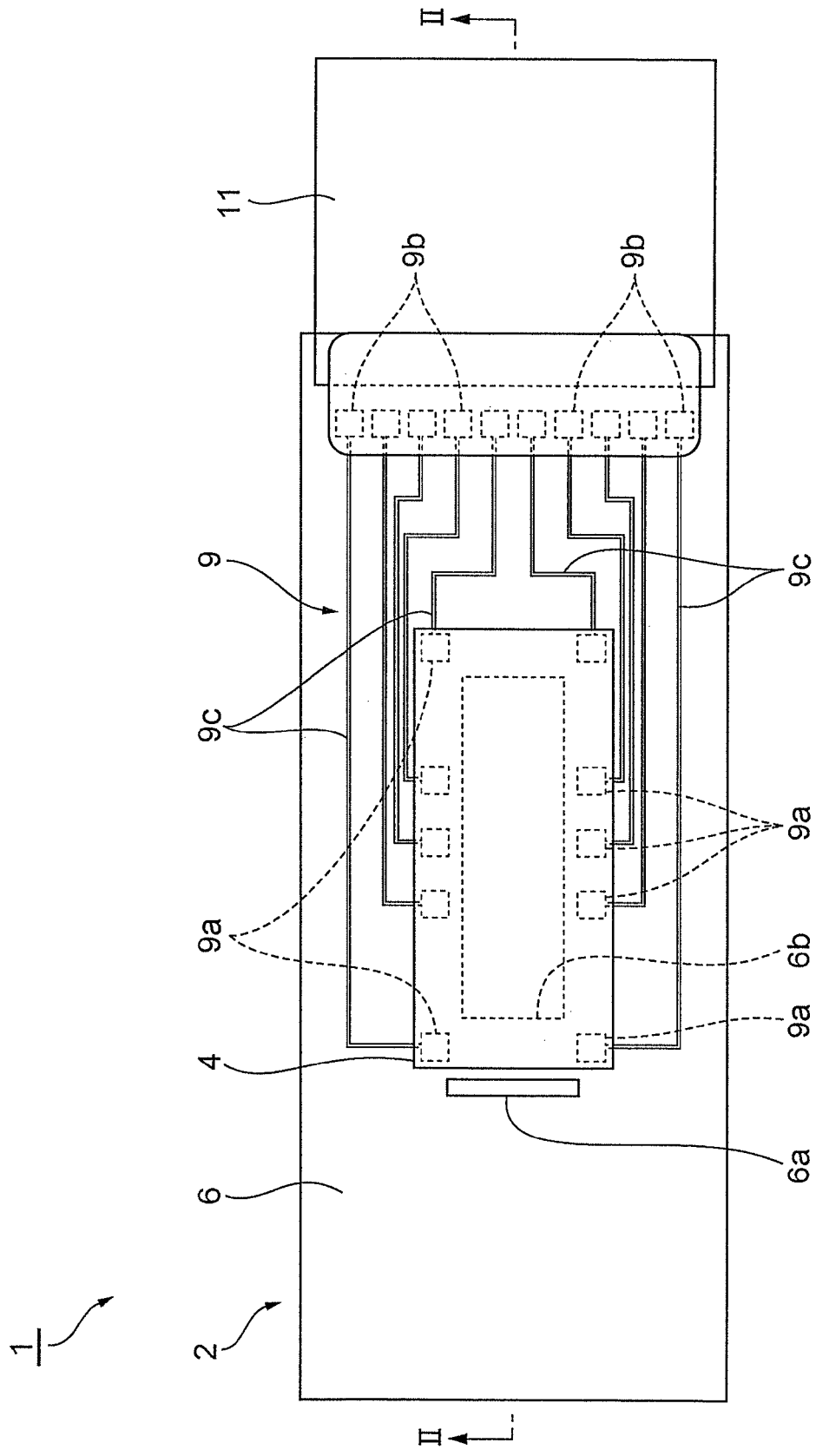
FIG. 1 is a plan view of the spectroscopy module of a first embodiment.

1: spectroscopy module
2: body portion
2a: front plane (predetermined plane)
$2_1$ to $2_3$: light-transmitting members
3: spectroscopic portion
4: light detecting element
6, 7: light absorbing layer
6a, 7a: light-passing hole (first light-passing hole)
6b, 7b: light-passing hole (second light-passing hole)
9: wiring
13: light absorbing layer

BEST MODES FOR CARRYING OUT THE INVENTION

Hereinafter, a detailed description will be given to preferred embodiments of the present invention by referring to the drawings. It is noted that in the individual drawings, the same reference letters or numerals are given to the same and corresponding parts, with a overlapping description omitted.

First Embodiment

Figure 2:
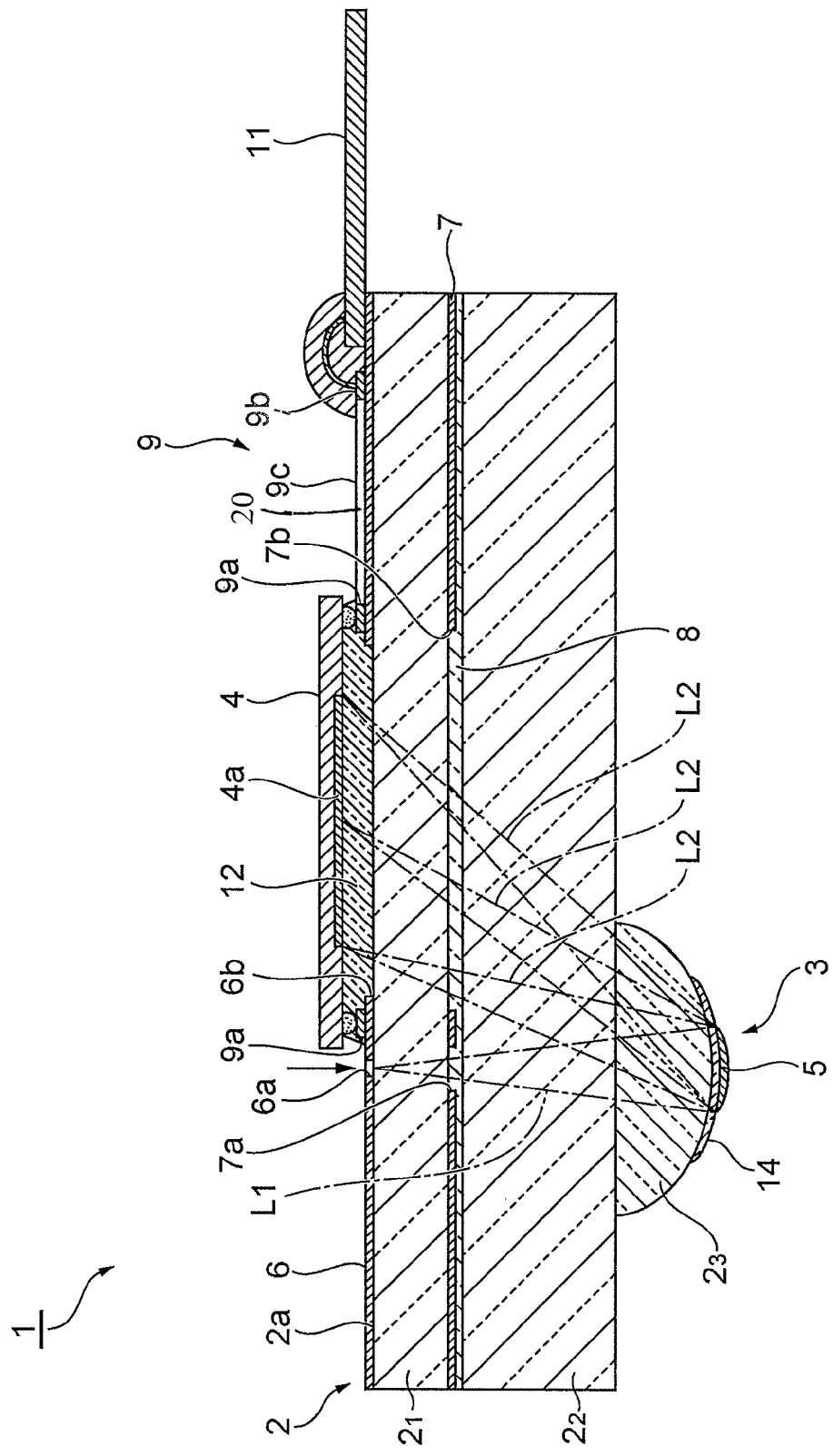
FIG. 2 is a cross sectional view taken along line II to II shown in FIG. 1.

As shown in FIG. 1 and FIG. 2, a spectroscopy module 1 is provided with a light-transmitting body portion 2, a spectroscopic portion 3 for dispersing light L1 made incident from a front plane (predetermined plane) 2a of the body portion 2 into the body portion 2 to reflect the light on the front plane 2a, and a light detecting element 4 supported on the front plane 2a to detect light L2 dispersed and reflected by the spectroscopic portion 3. The spectroscopy module 1 is to disperse the light L1 into a plurality of lights L2 by the spectroscopic portion 3 and detect the light L2 by the light detecting element 4, thereby measuring the wavelength distribution of the light L1, the intensity of a specific wavelength component, or the like.

The body portion 2 is provided with light-transmitting members $2_1$ to $2_3$ laminated in a direction approximately orthogonal to the front plane 2a. The light-transmitting members $2_1$, $2_2$ are formed in a rectangular thin plate shape by using light-transmitting glass or others such as BK7, Pyrex (registered trademark) and quartz. The light-transmitting member $2_3$ is formed by using the same materials as those of the light-transmitting member $2_1$, $2_2$, that is, a light-transmitting resin, a light-transmitting organic-inorganic hybrid material or light-transmitting low-menting-point glass for replica molding in a hemisphere or a curved-surface shape so as to give lens effects. And, for example, where the member is made with the same material as the light-transmitting members $2_1$, $2_2$, it is pasted to the light-transmitting member $2_2$ with an optical resin or by direct bonding. The light-transmitting member $2_3$ acts as a lens for forming an image on a light detecting portion 4a of the light detecting element 4 on the basis of the light L2 dispersed and reflected by the spectroscopic portion 3.

The spectroscopic portion 3 is a reflection-type grating having a diffraction layer 14 formed on the outer surface of the light-transmitting member $2_3$ and a reflection layer 5 formed on the outer surface of the diffraction layer 14. The diffraction layer 14 is a serrated cross-sectional blazed grating, a rectangular cross-sectional binary grating or a sinusoidal cross-sectional holographic grating, or the like. It is formed, for example, by coating a photosensitive resin on the outer surface of the light-transmitting member $2_3$ and then using a light-transmitting mold made of quartz or the like (grating mold) to subject the photosensitive resin to UV curing. Materials of the diffraction layer 14 are made more stable when heated and cured after UV curing. The reflection layer 5 is formed in a film shape, for example, by evaporating Al, Au or the like on the outer surface of the diffraction layer 14. It is noted that materials of the diffraction layer 14 shall not be limited to photosensitive resins but may include photosensitive glass, photosensitive organic-inorganic hybrid materials, heat-deformable resins/glass or organic-inorganic hybrid materials.

The light detecting element 4 is a photodiode array having the light detecting portion 4a in which long photodiodes are arrayed one-dimensionally in a direction approximately orthogonal to the longitudinal direction thereof. In the light detecting element 4, the direction of the one-dimensional array of photodiodes is approximately coincident with the longitudinal direction of the light-transmitting members $2_1$, $2_2$ and also the light detecting portion 4a is arranged so as to face the front plane 2a of the body portion 2. It is noted that the light detecting element 4 shall not be limited to the photodiode array but may include a C-MOS image sensor and a CCD image sensor.

On the front plane 2a of the body portion 2 (that is, the front plane of the light-transmitting member $2_1$), there is formed a light absorbing layer 6 having a light-passing hole (first light-passing hole) 6a through which light L1 advancing to the spectroscopic portion 3 passes and a light-passing hole (second light-passing hole) 6b through which light L2 advancing to the light detecting portion 4a of the light detecting element 4 passes. The light-passing hole 6a is a slit extending in a direction approximately orthogonal to the longitudinal direction of the light-transmitting members $2_1$, $2_2$. The light absorbing layer 6 is subjected to patterning so as to have the light-passing holes 6a, 6b and integrally formed by using CrO, a CrO-containing laminated film, black resist or the like. As shown in FIGS 1 and 2, the area of the second light-passing hole 6b is larger than the area of the first light-passing hole 6a. Also, as shown in FIG. 1, in a direction perpendicular to the direction along which the second light-passing hole 6b and the first light-passing hole 6a are juxtaposed, the width of the first light-passing hole 6b is larger than the width of the second light-passing hole 6b.

Between the light-transmitting members $2_1$, $2_2$ adjacent to each other in a direction approximately orthogonal to the front plane 2a of the body portion 2, there is formed a light absorbing layer 7 having a light-passing hole (first light-passing hole) 7a through which light L1 advancing to the spectroscopic portion 3 passes and a light-passing hole (second light-passing hole) 7b through which light L2 advancing to the light detecting portion 4a of the light detecting element 4 passes. The light absorbing layer 7 is formed on the back plane of the light-transmitting member $2_1$. Further, the light-transmitting member $2_1$ on which the light absorbing layer 7 is formed is pasted to the light-transmitting member $2_2$ by using an optical resin 8 adjusted for the refraction index so that no reflection can take place on a boundary face. The light absorbing layer 7 is subjected to patterning so as to have the light-passing holes 7a, 7b and integrally formed by using CrO, a CrO-containing laminated film, black resist or the like. As shown if FIG. 2, the area of the first light-passing hole 7a of the light absorbing layer formed between the light-transmitting member is larger than the area of the first light-passing hole 6a of the light absorbing layer formed on the predetermined plane and the area of the second light-passing hole 7b of the light absorbing layer formed between the light-transmitting member is larger than area of the second light-passing hole of the light absorbing layer formed on the predetermined plane.

The light absorbing layer 6 is made rough on a front plane, and a wiring 9 formed by using a single layer of Al, Au or the like or a laminated film of Ti—Pt—Au, Ti—Ni-An, Cr—Au or the like is formed on the front plane. The wiring 9 is provided with a plurality of pad portions 9a arranged around the light-passing hole 6b, a plurality of pad portions 9b arranged at the ends of the light-transmitting members $2_1$, $2_2$ in the longitudinal direction and a plurality of connection portions 9c for connecting the corresponding pad portions 9a and pad portions 9b. An external terminal of the light detecting element 4 is electrically connected to the pad portions 9a by flip chip bonding, and a flexible printed board 11 for taking out an output signal of the light detecting element 4 is electrically connected to the pad portions 9b by wire bonding. The light detecting element 4 is supported on the front plane 2a of the body portion 2 in a state that the light detecting portion 4a faces the light-passing hole 6b of the light absorbing layer 6, and an optical resin 12 adjusted for the refraction index so that no reflection takes place on a boundary face is loaded as an underfill resin between the light detecting portion 4a and the front plane 2a.

An electrical insulation layer 20 is preferably formed in a film shape between the light absorbing layer 6 and the wiring 9 by using an insulating resin such as $SiO_2$, SiN or SiON. This is because where the light absorbing layer 6 is made with black resist, the black resist is thermally affected and degenerated to be electrically conductive due to carbon contained on the light absorbing layer 6, and there may occur a short circuit if no electrical insulation layer is formed.

In the above-constituted spectroscopy module 1, light L1 is made incident from the front plane 2a of the body portion 2 via the light-passing hole 6a of the light absorbing layer 6, advancing to the light-transmitting member $2_1$, the light-passing hole 7a of the light absorbing layer 7, and the light-transmitting members $2_2$, $2_3$, arriving at the spectroscopic portion 3, and dispersed into a plurality of lights L2 by the spectroscopic portion 3. The thus dispersed light L2 is reflected to the direction of the front plane 2a of the body portion 2 by the spectroscopic portion 3, advancing to the light-transmitting member $2_3$,$2_2$, the light-passing hole 7b of the light absorbing layer 7, the light-transmitting member $2_1$, the light-passing hole 6b of the light absorbing layer 6, arriving at the light detecting portion 4a of the light detecting element 4, and detected by the light detecting element 4.

As described so far, in the spectroscopy module 1, the light absorbing layer 6 having the light-passing hole 6a through which light L1 advancing to the spectroscopic portion 3 passes and the light-passing hole 6b through which light L2 advancing to the light detecting portion 4a of the light detecting element 4 passes is formed integrally by patterning. Therefore, it is possible to prevent the deviation of a relative positional relationship between the light-passing hole 6a and the light-passing hole 6b. Further, since the occurrence of stray light is suppressed by the light absorbing layer 6 and the stray light is absorbed, the stray light can be suppressed from being made incident into the light detecting portion 4a of the light detecting element 4. Therefore, according to the spectroscopy module 1, it is possible to improve the reliability.

Further, the body portion 2 is provided with light-transmitting members $2_1$ to $2_3$ laminated in a direction approximately orthogonal to the front plane 2a, and the light-transmitting member $2_1$ having the front plane 2a is also formed in a plate shape. Thereby, it is possible to form the light absorbing layer 6 and implement the light detecting element 4 at the body portion 2 in a simple manner.

Still further, between the light-transmitting members $2_1$, $2_2$ adjacent to each other in a direction approximately orthogonal to the front plane 2a of the body portion 2, there is formed the light absorbing layer 7 having the light-passing hole 7a through which light L1 advancing to the spectroscopic portion 3 passes and the light-passing hole 7b through which light L2 advancing to the light detecting portion 4a of the light detecting element 4 passes. Thereby, it is possible to limit light L1, L2 which advance to the body portion 2 while spreading in such a manner that they can arrive at a desired region and also suppress more effectively stray light from being made incident into the light detecting element 4.

In addition, the wiring 9 electrically connected to the light detecting element 4 is formed on the front plane (that is, the plane opposite to the front plane 2a of the body portion 2) of the light absorbing layer 6. Thereby, it is possible to prevent the stray light from being reflected in a diffused manner by the wiring 9.

Second Embodiment

The spectroscopy module 1 of a second embodiment is different from the spectroscopy module 1 of the above-described first embodiment in that the wiring 9 is formed on the front plane 2a of the body portion 2.

Figure 3:
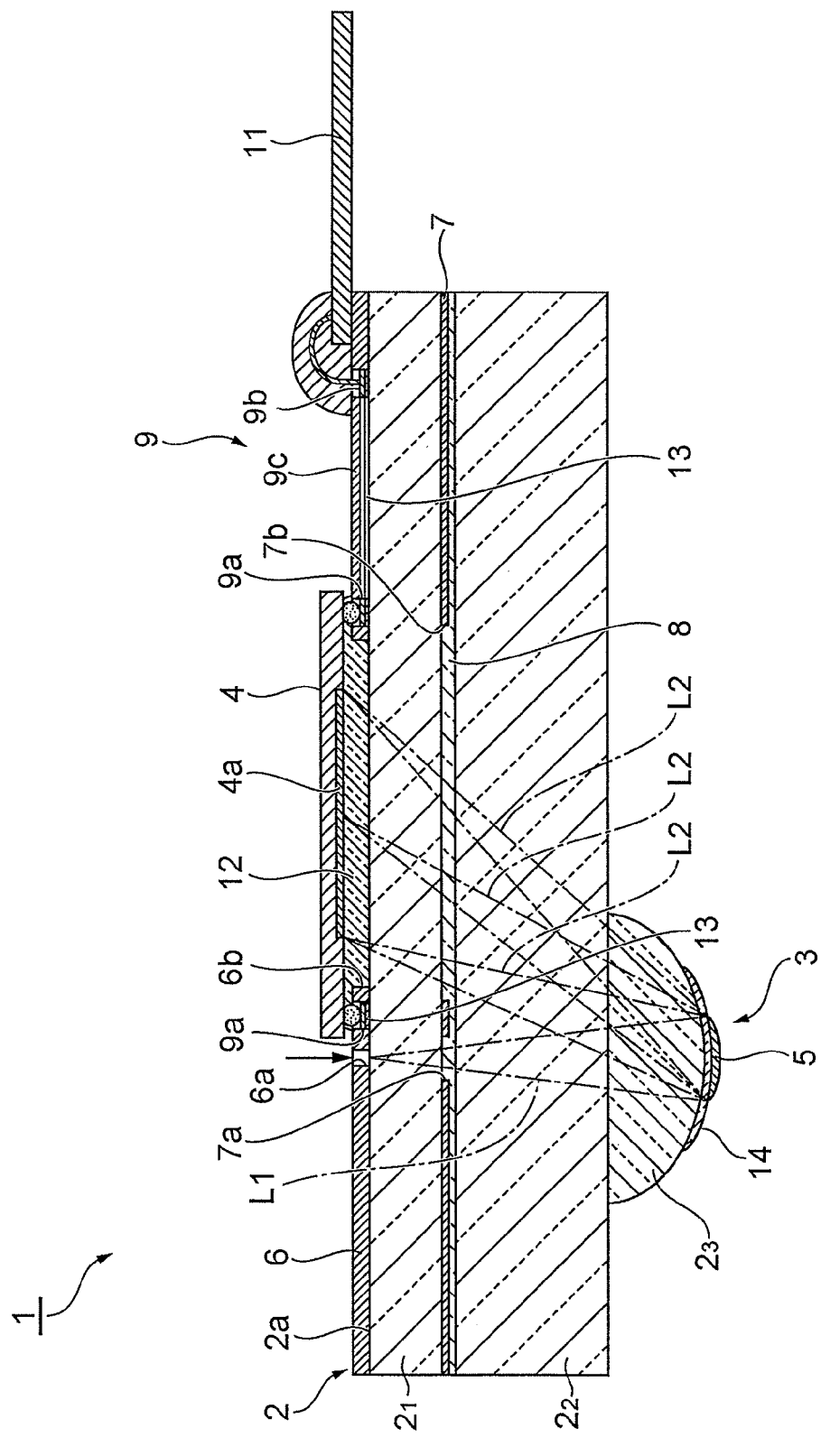
FIG. 3 is a longitudinal sectional view of the spectroscopy module of a second embodiment.

More specifically, as shown in FIG. 3, the wiring 9 is formed on the front plane 2a of the body portion 2, a connection portion 9c of the wiring 9 is covered with the light absorbing layer 6, and pad portions 9a, 9b of the wiring 9 are exposed from the light absorbing layer 6. Since the wiring 9 can be more firmly attached to the body portion 2, it is possible to prevent the wiring 9 from being broken.

Further, the wiring 9 is provided with a light absorbing layer 13 made with a single layer of CrO or the like or a laminated film of Cr—CrO or the like on the front plane 2a of the body portion 2. It is, therefore, possible to prevent stray light from being reflected in a diffused manner by the wiring 9.

The present invention shall not be limited to the above-described first and second embodiments.

Figure 4:
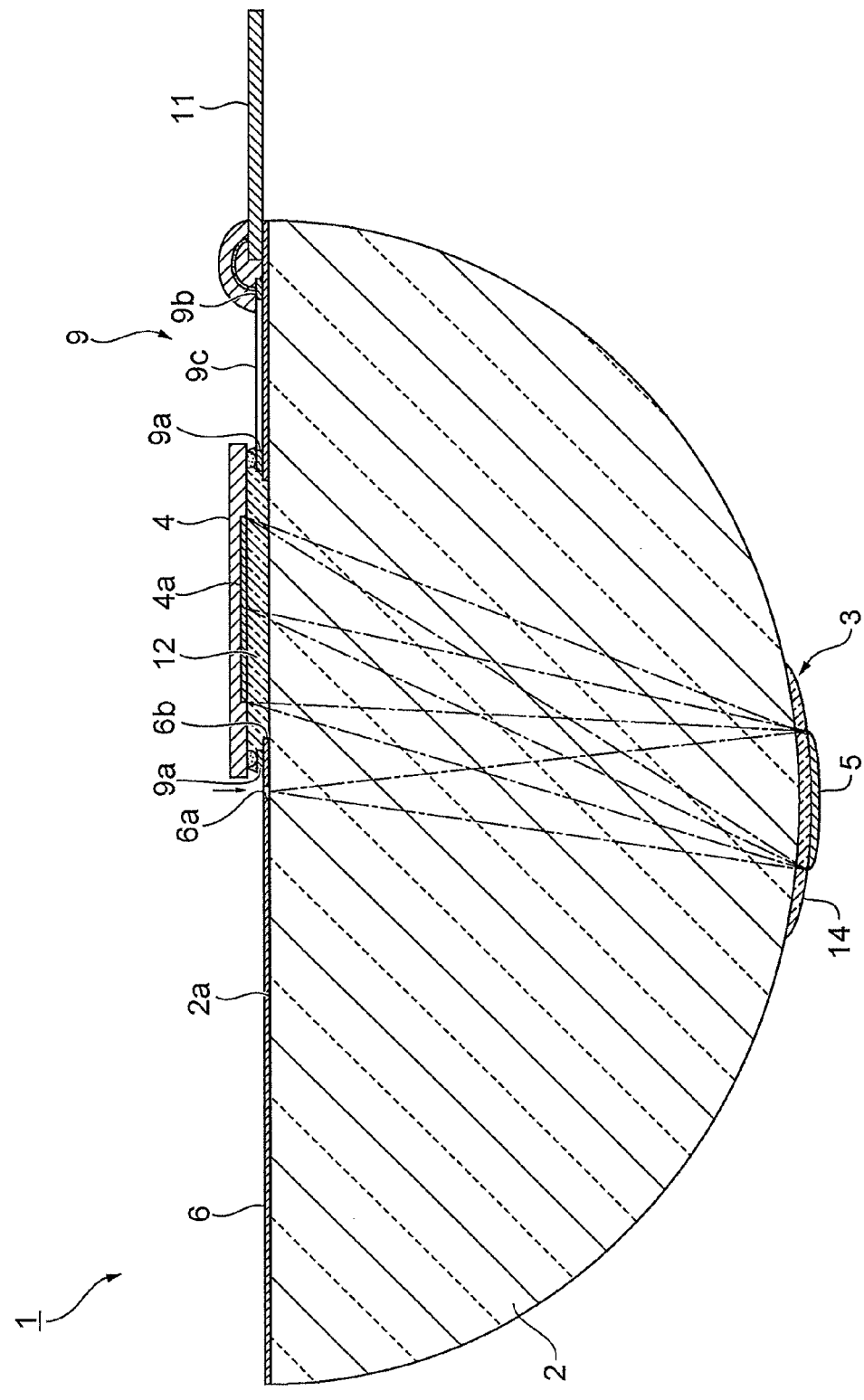
FIG. 4 is a longitudinal sectional view of the spectroscopy module of another embodiment.

For example, as shown in FIG. 4, the body portion 2 may be formed in such a shape that a semispherical lens is cut out by two flat planes which are approximately orthogonal to the flat plane portion thereof and also approximately parallel with each other. In this instance, the flat plane portion of the semispherical lens is given as the front plane 2a of the body portion 2, and the spectroscopic portion 3 is formed at a curved portion of the semispherical lens.

Figure 5:
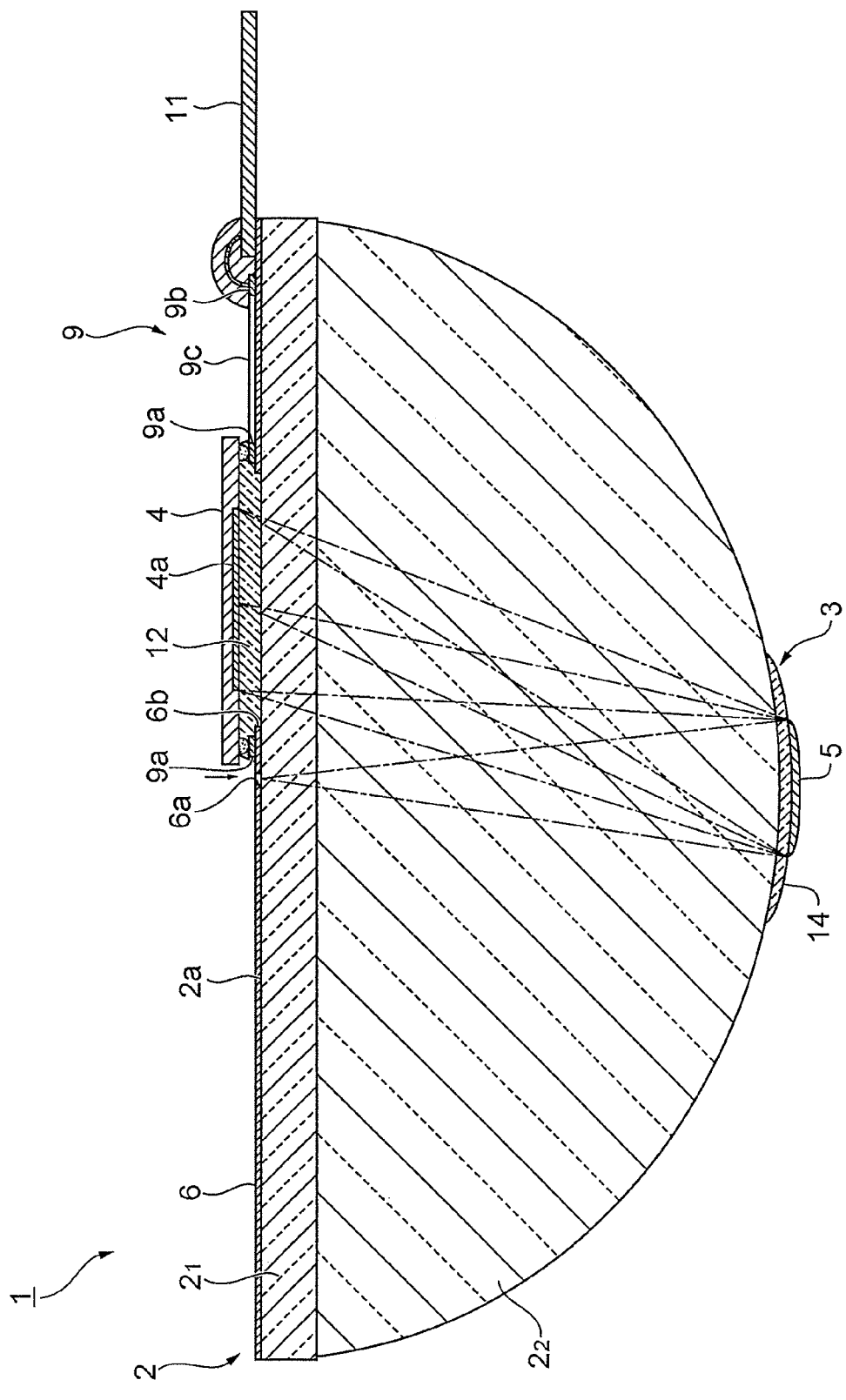
FIG. 5 is a longitudinal sectional view of the spectroscopy module of another embodiment.

Further, as shown in FIG. 5, the body portion 2 may be such that the light-transmitting member $2_1$ in a long thin plate shape is pasted to a flat portion of the light-transmitting member $2_2$ formed so that the semispherical lens is cut out by two flat planes approximately orthogonal to the flat plane portion thereof and also approximately parallel with each other with the use of an optical resin or by direct bonding. In this instance, the front plane of the light-transmitting member $2_1$ is given as the front plane 2a of the body portion 2, and the spectroscopic portion 3 is formed at a curved portion of the light-transmitting member $2_2$.

Figure 6:
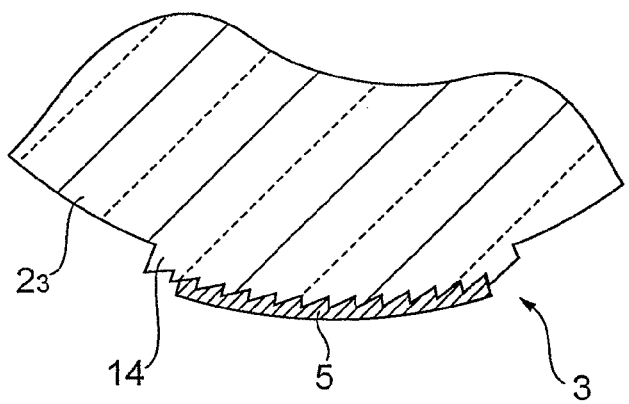
FIG. 6 is a longitudinal sectional view showing the vicinity of a spectroscopic portion of the spectroscopy module of another embodiment.

Still further, as shown in FIG. 6, the light transmitting member $2_3$ which acts as a lens may be formed integrally with the diffraction layer 14, for example, by using light-transmitting low-melting point glass for replica molding. Thereby, it is possible to simplify the manufacturing process and also prevent the deviation of a relative positional relationship between the light-transmitting member $2_3$ and the diffraction layer 14.

INDUSTRIAL APPLICABILITY

According to the present invention, it is possible to improve the reliability.

What is claimed is:
1. A spectroscopy module comprising: a light-transmitting body portion;
   a spectroscopic portion for dispersing light made incident from a predetermined plane of the body portion into the body portion, and reflecting the light on the predetermined plane;
   the spectroscopic portion is arranged on a plane of the body portion, the plane facing the predetermined plane; and a light detecting element supported on the predetermined plane to detect the light dispersed and reflected by the spectroscopic portion;

wherein a light absorbing layer having a first light-passing hole through which light advancing to the spectroscopic portion passes and a second light-passing hole through which light advancing to the light detecting element passes is formed on the predetermined plane.

2. The spectroscopy module as set forth in claim 1, wherein the body portion is provided with a plurality of light-transmitting members laminated in a direction approximately orthogonal to the predetermined plane.

3. The spectroscopy module as set forth in claim 2, wherein the light-transmitting members having the predetermined plane are formed in a plate shape.

4. The spectroscopy module as set forth in claim 2, wherein a light absorbing layer is formed between the light-transmitting members adjacent to each other in a direction approximately orthogonal to the predetermined plane.

5. The spectroscopy module as set forth in claim 1, wherein wiring electrically connected to the light detecting element is formed on the predetermined plane, a wiring is electrically connected to an external terminal of the light detecting element, the external terminal facing the predetermined plane.

6. The spectroscopy module as set forth in claim 5, wherein the wiring is provided with a light absorbing layer on the predetermined plane.

7. The spectroscopy module as set forth in claim 1, wherein the wiring electrically connected to the light detecting element is formed on a plane opposite to the predetermined plane on the light absorbing layer formed on the predetermined plane, a wiring is electrically connected to an external terminal of the light detecting element, the external terminal facing the predetermined plane.

8. The spectroscopy module as set forth in claim 1, wherein the area of the second light-passing hole is larger than the area of the first light-passing hole.

9. The spectroscopy module as set forth in claim 1, wherein the spectroscopic portion has a diffraction layer formed on the outer surface of the light-transmitting body portion, the outer surface formed in a hemisphere or a curved-surface shape.

10. The spectroscopy module as set forth in claim 1, wherein in a direction perpendicular to the direction along which the second light-passing hole and the first light-passing hole are juxtaposed, the width of the first light-passing hole is larger than the width of the second light-passing hole.

11. The spectroscopy module as set forth in claim 4, wherein the area of the first light-passing hole of the light absorbing layer formed between the light-transmitting members is larger than the area of the first light-passing hole of the light absorbing layer formed on the predetermined plane and the area of the second light-passing hole of the light absorbing layer formed between the light-transmitting members is larger than the area of the second light-passing hole of the light absorbing layer formed on the predetermined plane.

12. The spectroscopy module as set forth in claim 5 or 7, wherein an electrical insulation layer is formed in a film shape between the light absorbing layer and the wiring.

13. The spectroscopy module as set forth in claim 5, wherein a connection portion of the wiring is covered with the light absorbing layer and pad portions of the wiring are exposed from the light absorbing layer.

* * * * *